United States Patent
Small et al.

(10) Patent No.: US 9,645,917 B2
(45) Date of Patent: May 9, 2017

(54) SPECIALIZING I/O ACCESS PATTERNS FOR FLASH STORAGE

(75) Inventors: Christopher Small, Cambridge, MA (US); Stephen M. Byan, Littleton, MA (US); James F. Lentini, Woburn, MA (US)

(73) Assignee: NetApp, Inc., Sunnyvale, CA (US)

( * ) Notice: Subject to any disclaimer, the term of this patent is extended or adjusted under 35 U.S.C. 154(b) by 335 days.

(21) Appl. No.: 13/477,966

(22) Filed: May 22, 2012

(65) Prior Publication Data

US 2013/0318283 A1 Nov. 28, 2013

(51) Int. Cl.
*G06F 12/02* (2006.01)
*G06F 12/0866* (2016.01)

(52) U.S. Cl.
CPC ...... *G06F 12/0246* (2013.01); *G06F 12/0866* (2013.01); *G06F 2212/222* (2013.01); *G06F 2212/7203* (2013.01)

(58) Field of Classification Search
CPC ............. G06F 12/0246; G06F 12/0866; G06F 2212/222; G06F 2212/7203
See application file for complete search history.

(56) References Cited

U.S. PATENT DOCUMENTS

| | | | |
|---|---|---|---|
| 2005/0132126 A1* | 6/2005 | Lin et al. ....................... | 711/103 |
| 2006/0059326 A1* | 3/2006 | Aasheim ............. | G06F 12/0246 711/203 |
| 2010/0088465 A1* | 4/2010 | Asano et al. ................. | 711/103 |
| 2011/0093648 A1* | 4/2011 | Belluomini ......... | G06F 12/0868 711/103 |
| 2011/0099349 A1* | 4/2011 | Yano et al. .................... | 711/170 |
| 2011/0258391 A1* | 10/2011 | Atkisson ............... | G06F 11/108 711/118 |
| 2012/0047332 A1* | 2/2012 | Bannon ............... | G06F 12/0804 711/135 |

OTHER PUBLICATIONS

Improving Cache Performance by Selective Cache Bypass. Chi-Hung Chi and Henry Dietz. IEEE 1989. pp. 277-285.*
International Preliminary Report on Patentability for Application No. PCT/US2013/042289 mailed on Nov. 25, 2014, 6 pages.
International Search Report and Written Opinion for Application No. PCT/US2013/042289 mailed on Aug. 30, 2013, 7 pages.

* cited by examiner

*Primary Examiner* — David X Yi
*Assistant Examiner* — Tahilba Puche
(74) *Attorney, Agent, or Firm* — Cesari and McKenna, LLP

(57) ABSTRACT

Systems and methods for efficiently using solid-state devices are provided. Some embodiments provide for a data processing system that uses a non-volatile solid-state device as a circular log, with the goal of aligning data access patterns to the underlying, hidden device implementation, in order to maximize performance. In addition, metadata can be interspersed with data in order to align data access patterns to the underlying device implementation. Multiple input/output (I/O) buffers can also be used to pipeline insertions of metadata and data into a linear log. The observed queuing behavior of the multiple I/O buffers can be used to determine when the utilization of the storage device is approaching saturation (e.g., in order to predict excessively-long response times). Then, the I/O load on the storage device may be shed when utilization approaches saturation. As a result, the overall response time of the system is improved.

22 Claims, 7 Drawing Sheets

SPECIALIZING I/O ACCESS PATTERNS FOR FLASH STORAGE

TECHNICAL FIELD

Various embodiments disclosed herein generally relate to solid-state storage devices. More specifically, some embodiments relate to systems and methods for optimizing writes to solid-state storage devices.

BACKGROUND

Various types of non-volatile storage media such as, for example, relatively high latency (i.e., longer access times) hard disk drive devices (HDDs) and relatively low latency (i.e., shorter access times) solid-state devices (SSDs) such as flash memory or DRAM can be used for storing information. HDDs generally provide good streaming performance (e.g., reading of large sequential blocks or "track reads") but do not perform well on random access (i.e., reading and writing of individual disk sectors) due to slow access times. SSDs, on the other hand, are more suitable for random and frequent memory accesses because of their relatively low latency. With no moving parts, SSDs do not have mechanical delays resulting in the high latency experienced by HDDs and seek time is decreased significantly, making the SSDs very fast.

Flash memory is generally accepted as a new tier in the memory hierarchy between DRAM and disk. In terms of cost per gigabyte (GB), DRAM capacity is more expensive than flash capacity, which is more expensive than hard disk capacity. At the same time, DRAM latencies are less than flash, and flash latencies are less than hard disk. As a result, the cost per input/output (I/O) operation of flash memory is between DRAM and magnetic media. This placement in the memory hierarchy often makes flash memories ideal for caching.

While flash and other solid-state memories sometimes provide for the same interface as a SCSI or SATA drive, the underlying operation, implementation, and performance between solid-state memories and SCSI or SATA drives may differ substantially. For example, one of the primary differences is that storage locations in SSDs need to be erased before information can be written to them. The device is typically erased in units (erase blocks) larger than a traditional write unit (sectors). Even with these operational differences, SSDs often use the input/output interfaces developed for HDDs. As a result, the integration and implementation of SSD memories based on algorithms developed for HDD may not capture the full benefit of SSD memories, since the algorithms are not optimized for the characteristics of SSD based storage. Consequently, improved techniques are needed to employ more effectively flash memory and other solid-state devices.

SUMMARY

Various embodiments introduced here generally relate to systems and methods for customizing input/output (I/O) access patterns for a flash or other non-volatile solid-state storage device. Some embodiments use this customization to create a flash friendly caching algorithm. These techniques, together with various associated components and operations, are able to more efficiently utilize non-volatile solid-state devices (e.g., flash devices, battery-backed RAM, and others). For example, unlike hard-disk drives, erasing data from a solid-state drive typically takes more time than writing. As a result, performing an erase to recover one free sector is less valuable than performing an erase to recover a full erase block of sectors. Therefore, in some embodiments described herein, writes are performed to the solid-state storage device only in integral multiples of erase blocks. In addition, hard-disk drives often segregate metadata from data to minimize seek time. However, since seek time is not a concern for solid-state devices, metadata may be commingled with the data in many embodiments.

In certain embodiments, a non-volatile solid-state drive has an associated translation layer to map logical sector addresses to physical addresses in the nonvolatile solid-state drive, the non-volatile solid-state drive is treated as a circular log for storing data (e.g., in a host-side cache), and the data are written to the non-volatile solid-state drive in write units the sizes of which are integer multiples of a size of an erase block of the nonvolatile solid-state drive. Since at least some non-volatile solid-state drives must be erased in erase blocks before writing, this combination of techniques, and variations on it, aligns data access patterns to the underlying, hidden device implementation in order to improve performance.

Embodiments of the present invention also include other methods, systems with various components, and computer-readable storage media containing sets of instructions to cause one or more processors to perform the methods, variations of the methods, and other operations described herein. While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
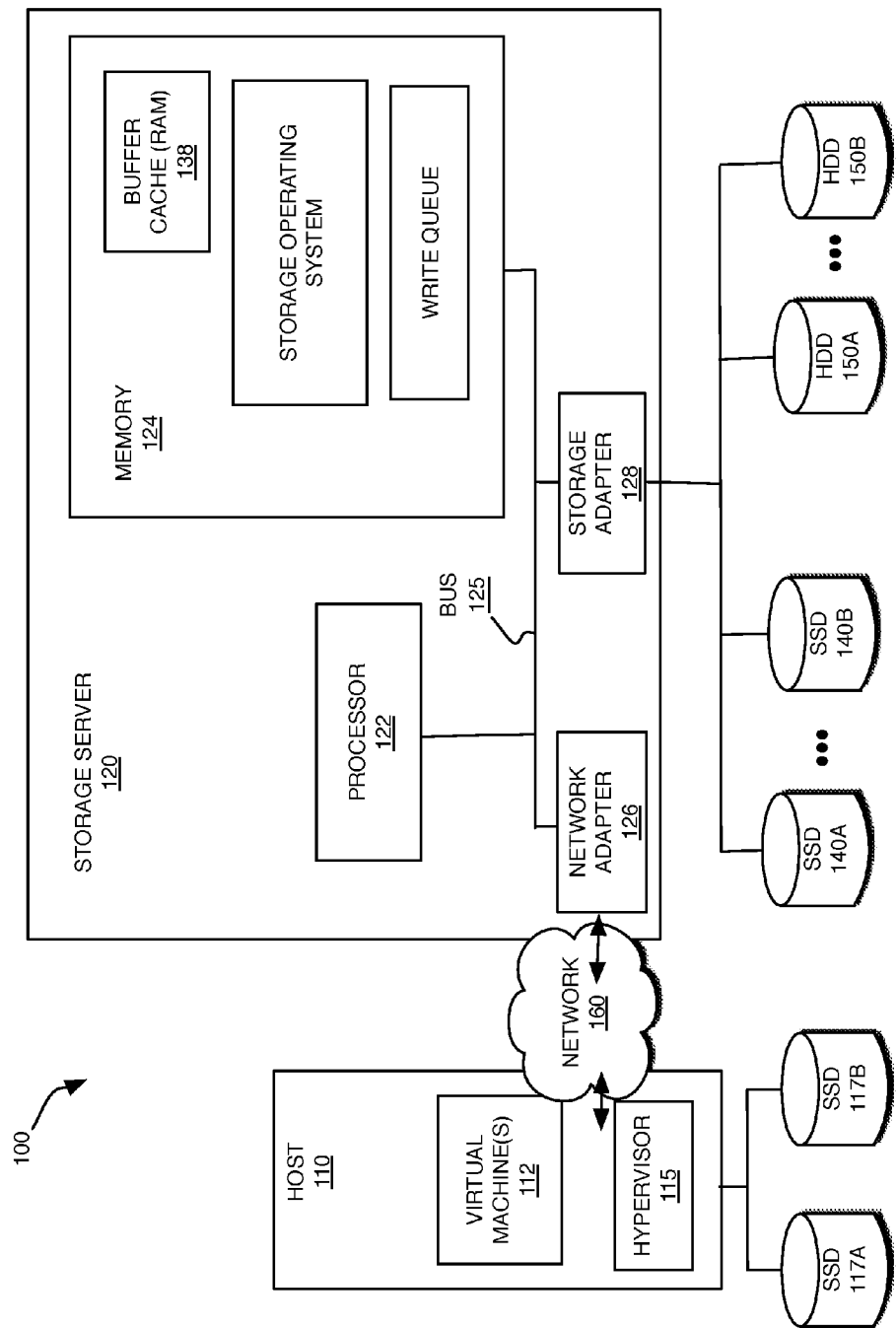
FIG. 1 shows a block diagram of a processing system in which some embodiments of the techniques introduced here may be implemented or utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Flash-based solid-state storage devices (SSDs) and other SSDs provide a random-access interface and sometimes masquerade as a SCSI or SATA disk drive. However, the underlying implementation and performance profile differs substantially from disk drives. A disk drive, in the common case, will have physical sectors on the disk that are arranged in the same order as the logical sectors exported by the random-access interface. For example, sector n is physically adjacent to sector n+1, and writing sectors n . . . (n+m) will take about half as long as writing sectors n . . . (n+2m). The time it takes to perform a disk write is effectively deterministic and induced by the size of the write and physical characteristics and state of the disk (i.e., the number of sectors written, the starting position of the disk head, and the rotational speed of the platter). Once the disk head is positioned appropriately, the time to write sectors n . . . (n+m) is determined by the physical characteristics of the drive.

Although a flash drive commonly provides the same interface as a disk drive, the implementation is very different. One of the primary differences is that flash memory needs to be erased before writing, and erased in units (erase blocks) larger than a traditional write unit (sectors). To effectively masquerade as a disk drive, a conventional flash drive uses flash translation layer (FTL) software. An FTL maps a set of logical sector addresses to a substantially larger physical storage pool, typically making no attempt to map logical sector n to physical sector n. As data is written to a flash drive, the FTL stores the data in currently-unallocated physical storage, retaining a mapping from the logical sector number associated with the data to the physical sector holding that data. When a logical sector is rewritten, the FTL makes no attempt to store the new data in the same physical sector; instead it marks the old logical-to-physical mapping as invalid and the old physical sector as available for reuse, and writes the new data to a different physical sector. If this process were to continue, it would eventually result in all of the physical storage being filled.

To keep flash drives from filling completely and to make storage available, SSDs are typically provisioned with more physical storage than they offer as logical storage. In addition, the FTL performs cleaning (sometimes called "garbage collection"). Typically the cleaning process includes choosing a region of the physical storage that is one or more erase blocks, determining which of the sectors in the region are still valid, copying the sectors to an available region of the storage, updating the logical-to-physical mapping of those sectors, and then performing a bulk erase of the region. An invalid sector in the region will result in a net increase in available physical sectors.

Unfortunately, the erase operation consumes considerable time, substantially more than a write operation. As a result, the time to write to a flash drive depends on how "dirty" the drive is (how much free space is currently available), how that space is distributed across the drive, how aggressive the FTL is in performing cleaning in the background, how much idle time the drive has, and a host of other factors.

Various embodiments of the techniques presented here reduce the amount of necessary housekeeping. In some embodiments, techniques are disclosed for writing metadata and data to a flash storage device in ways that provide high performance (e.g., incurring low time overhead or low latency) from the device. One application of these techniques is in a cache (e.g., a host-side flash cache, or other types of flash caches such as in a network, virtual machine hypervisor on a server, etc.)

Some embodiments provide for a data storage system that uses a non-volatile solid-state storage device (e.g., a flash storage device) as a circular log, with the goal of aligning data access patterns to the underlying, hidden device implementation, in order to maximize performance. For example, the write blocks can be an integral number of the erase blocks of the device. In addition, metadata (descriptive data) can be interspersed with data into a linear log in order to align data access patterns to the underlying device implementation. Some embodiments also use a technique of cleaning the linear log entries using read-ahead or avoidance depending on the replacement algorithm. Multiple I/O buffers can also be used to pipeline insertions of metadata and data into a linear log. The observed queuing behavior of the multiple I/O buffers can be used to determine when the utilization of the storage device is approaching saturation (e.g., in order to predict excessively-long response times). Then, the I/O load on the storage device may be shed to a backing store containing identical copies of the data when utilization approaches saturation. As a result, the overall response time of the system is improved.

FIG. 1 shows a block diagram of a processing system 100 in which some embodiments of the techniques introduced here may be utilized. In the embodiments shown in FIG. 1, processing system 100 includes a host 110 having a virtual machine 112 using hypervisor 115 to interact with storage server 120. As illustrated in FIG. 1, storage server 120 includes one or more processors 122, a memory 124 with buffer cache 138, a network adapter 126, and a storage adapter 128 interconnected by a system bus 125.

Hypervisor 115 is virtual machine manager (VMM) that allows multiple operating systems to run concurrently on a host computer. Hypervisor 115 presents a virtual operating platform to the operating systems. In many cases, multiple instances of a variety of operating systems may share the virtualized hardware resources. In various embodiments of the present invention, to enable cache consistency through live virtual machine migrations and data management operations on virtual disks, a non-volatile solid-state cache using SSD 117A (e.g., PCIe flash card) attached to host 110 may be used by hypervisor 115. The techniques disclosed for writing metadata and data can be used with the solid-state cache in ways that improve performance (e.g., lowering overhead time or latency).

Host(s) 110 and virtual machine(s) 112 may each interact with the storage server 120 in accordance with a client/server model of information delivery. That is, the host(s) 110 may request the services of the storage server 120 and the system may return the results of the services requested by the host 110, such as by exchanging packets over the network 160. The virtual host(s) 110 may issue packets including file-based access protocols such as the Common Internet File System (CIFS) protocol or Network File System (NFS) protocol over TCP/IP when accessing information in the form of files. Alternatively, the host(s) 110 may issue packets including block-based access protocols such as the Small Computer Systems Interface (SCSI) protocol encapsulated over TCP (iSCSI) and SCSI encapsulated over Fibre Channel Protocol (FCP) when accessing information in the form of LUNs or blocks.

The storage server 120 can be a computer that provides storage services relating to the organization of information on writable, persistent storage media, such as SSDs and HODs. The storage server 120 also includes a storage operating system that implements a file system to logically organize the stored data as a hierarchical structure of logical data containers (e.g., volumes, logical units, directories and/or files) on the electronic storage media 140 and magnetic storage media 150.

It will be understood by those skilled in the art that the techniques introduced here may apply to any type of special-purpose computer (e.g., file server or storage serving appliance) or general-purpose computer embodied as, or having a storage server including a standalone computer or portion thereof. While FIG. 1 illustrates a monolithic, non-distributed storage server 120, various embodiments are applicable to other types of storage configurations (e.g., cluster storage configurations). Moreover, the teachings of this description can be adapted to a variety of storage server architectures including, but not limited to, a network-attached storage (NAS), storage area network (SAN), or a storage device assembly directly-attached to a client or host computer. The term "storage server" should therefore be taken broadly to include such arrangements, including a storage server that provides file-based access to data, block-based access to data, or both.

Memory 124 includes storage locations that are addressable by the processor(s) 122 and adapters and can store software programs and data structures to carry out the techniques described herein. Processor(s) 122 and adapters may, in turn, include processing elements and/or logic circuitry configured to execute the software programs and manipulate the data structures. A storage operating system, portions of which may be resident in memory 124 and may be executed by the processor(s) 122, functionally organizes the storage server by invoking storage operations in support of software processes executing on the server 120. It will be apparent to those skilled in the art that other memory mechanisms, such as various computer-readable media, may instead be used to store and execute program instructions pertaining to the embodiments described herein. The electronic storage media 140 and magnetic storage media 150 are configured to provide a persistent, writable storage space capable of maintaining data in the event of a power loss or other failure of the storage server 120. Accordingly, the electronic storage media 140 and magnetic storage media 150 may be embodied as large-volume memory arrays.

The network adapter 126 includes the circuitry and mechanical components needed to connect the storage server 120 to a host 110 over a network 160, which may include a point-to-point (P2P) connection or a shared medium. Network 160 can be any group of interconnected devices capable of exchanging information. In some embodiments, network 160 may be as few as several personal computers, special purpose computers, and/or general purposed computers on a Local Area Network (LAN) or as large as the Internet. In some cases, network 160 may be comprised of multiple networks (private and/or public), even multiple heterogeneous networks, such as one or more border networks, broadband networks, service provider networks, Internet Service Provider (ISP) networks, and/or Public Switched Telephone Networks (PSTNs), interconnected via gateways operable to facilitate communications between and among the various networks.

The storage adapter 128 cooperates with the storage operating system executing on the storage server 120 to access information requested by the host 110. The information may be stored on the electronic storage media 140 and magnetic storage media 150, which are illustratively embodied as SSDs and HODs. The storage adapter includes I/O interface circuitry that couples to the SSD 140 and HOD 150 over an I/O interconnect arrangement, such as a conventional high-performance Fibre Channel serial link topology. The information is retrieved by the storage adapter 128 and, if necessary, processed by the processor(s) 122 (or the adapter 128) prior to being forwarded over the system bus 125 to the network adapter 126 where the information is formatted into a packet and returned to the host 110.

In the illustrated embodiments, buffer cache 138 is part of the memory 124. However, this is by way of example and not of limitation as the buffer cache 138 may be coupled with the memory using, for example, a point-to-point connection. In addition, the buffer cache 138 may be separate from the memory 124, part of the memory 124, or part of the processor(s) 122. Generally, a buffer cache memory, such as buffer cache 138, includes a smaller, lower-latency (faster) memory such as RAM (e.g., DRAM), operable to reduce the average time to perform a memory access. The buffer cache typically stores copies of the data from the most frequently used locations in memory 124 so that when a memory access is performed, the buffer cache may first be checked to determine if required data is located therein, and, if so, the data may be accessed from the buffer cache 138 instead of the persistent storage media, such as SSDs or HDDs. In this manner, a buffer cache, such as buffer cache 138, reduces memory access times by avoiding having to access persistent storage to obtain the data.

Figure 2:
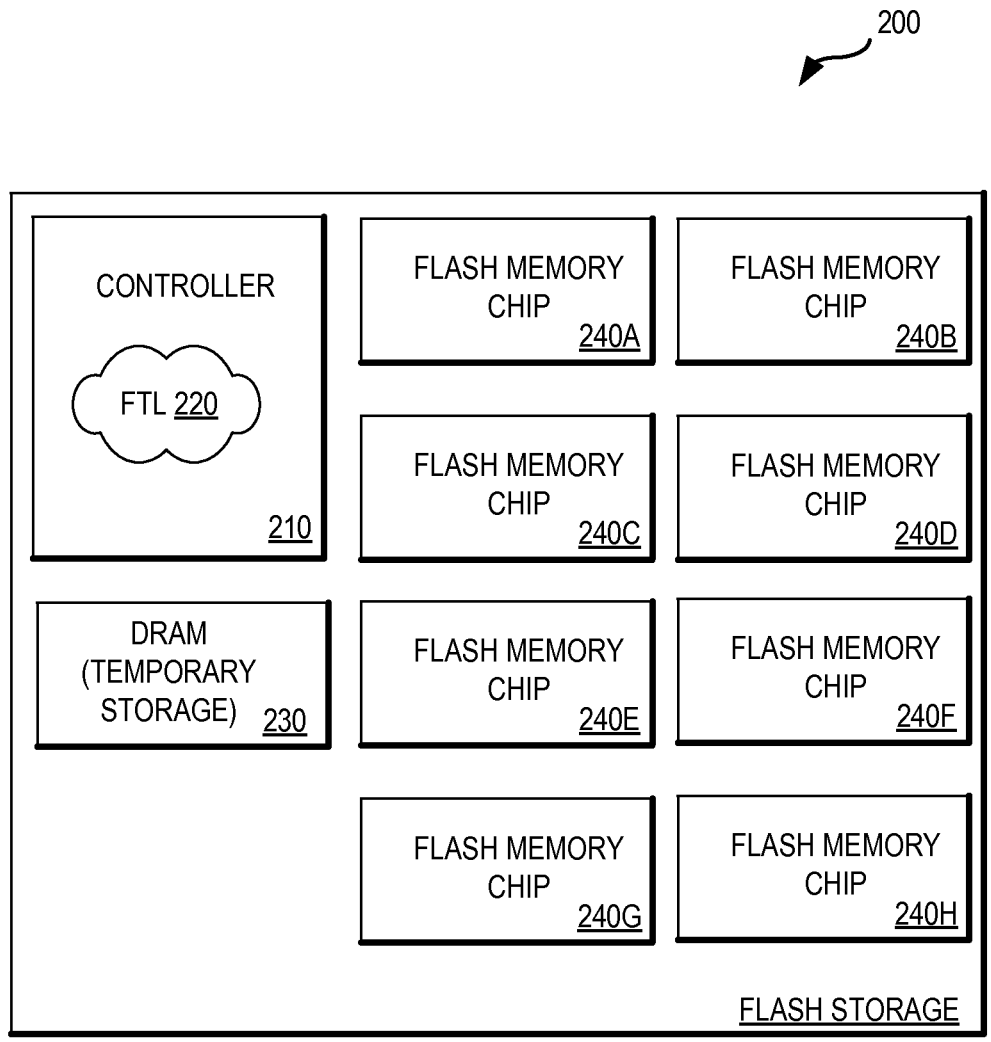
FIG. 2 is a block diagram illustrating components of a non-volatile solid-state memory device.

FIG. 2 is a block diagram illustrating components of a non-volatile solid-state memory device 200. The non-volatile solid-state memory device 200 may be used in any of a variety of places, and for any of a variety of purposes, within a storage environment. For example, the non-volatile solid-state memory device 200 may be a host-side cache or a cache for disk backing storage within processing system 100. The embodiment of the non-volatile solid-state memory device 200 illustrated in FIG. 2 includes a controller 210 running FTL software 220, temporary storage device 230, and flash memory chips 240A-240H each having multiple cells for storing data. Controller 210 accepts and responds to requests coming via a bus (e.g., PCIe, SATA, SAS, FC, or other bus) and interacts with the flash memory chips 240A-240H. As such, controller 210 typically includes the electronics (e.g., embedded processor) that bridge the flash memory chips 240A-240H (e.g., NAND memory components) to a host/client computer, bus, or server.

Controller 210 may perform a variety of functions including, but not limited to, garbage collection, encryption, caching (both read and write), error correction, and others. Typically, the FTL software 220 can include software running on the controller (e.g., on an embedded processor). FTL 220 maps logical (client) sector and page addresses to physical (internal) page addresses. As new data is sent to the flash drive, FTL 220 finds the appropriate unused space on the drive's flash memory chips 240A-240H and stores the data there. In many embodiments, FTL 220 uses an internal data structure to track the correspondence between logical and physical addresses.

Each memory cell in flash memory chips 240A-240H may be in a free state, a used state, or an invalid state. The free state indicates that the memory cell is not storing any data. The used state indicates that the memory cell is currently storing some data. The invalid state indicates that the data stored in the memory cell is no longer valid. A cell marked as invalid must be erased before new data can be written to that cell. However, most non-volatile solid-state memory devices can only be erased in blocks as described in more detail in FIG. 3.

Figure 3:
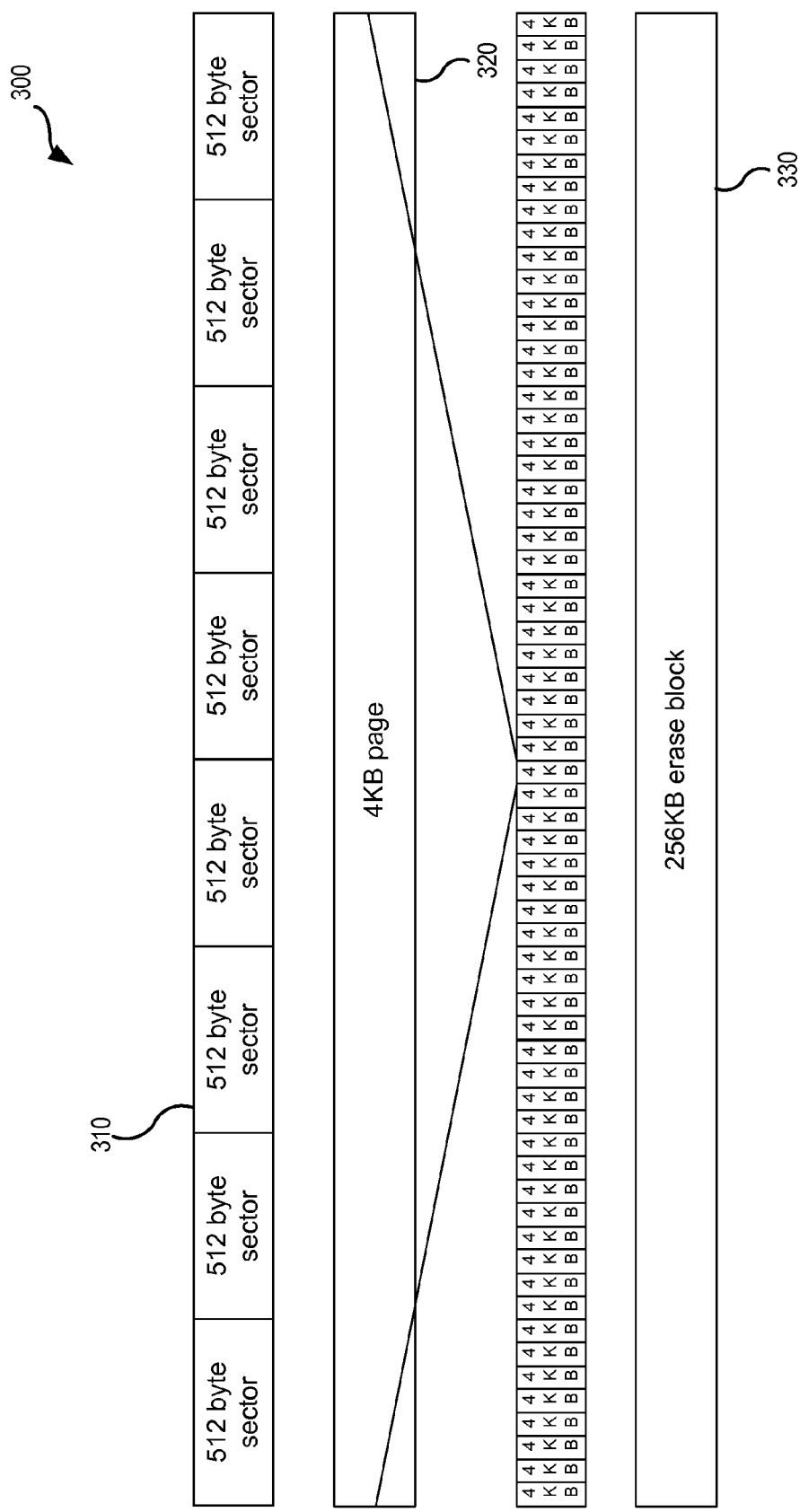
FIG. 3 is a block diagram illustrating examples of sectors, pages, and erase blocks of a non-volatile solid-state memory device.

FIG. 3 is a block diagram illustrating examples of sectors, pages, and erase blocks associated with non-volatile solid-state storage devices. A typical conventional SSD, such as a flash device, allows clients to read/write 512-byte sectors 310 but is implemented in terms of pages 320 (usually 2 KB, 4 KB, or 8 KB). Most SSDs must have the target storage locations erased to make free space before any writing can occur to those locations. One example is NAND flash. The minimum unit of erasure is referred to as an erase block 330. An erase block could be 32, 64, 128, or other number of pages.

Since erasing data from an SSD typically takes more time than writing data to the SSD, improving the efficiency in the time the drive spends performing the erase operations can result in significant performance improvements. For example, performing an erase to recover one free sector is less valuable than performing an erase to recover a full erase block of sectors. Various embodiments of the techniques introduced here align the blocks being written with blocks that are being invalidated. In some embodiments, an integral multiple i of an erase block of sectors can be written out at a time. A region the size of i erase blocks can be substantially simultaneously invalidated and allocated. This will result in erase operations that have full value.

The size of an erase block of the memory device may not always be initially known. Some embodiments estimate the size of the erase block using a variety of information and factors such as device type, manufacturer, etc. The estimates start with an erase block that is $2^j$ sectors in size for some j. Then, a write block of $2^k$ sectors may be written to the device, where k is chosen to be large enough to be at least as large as j. This will result in the drive invalidating, erasing, and writing $2^{k-j}$ erase blocks on each operation. This is in contrast to conventional methods of operating non-volatile solid-state memories where erasing can occur to recover one writing sector or a number of sectors that are less than the size of an erase block.

Traditionally, metadata (descriptive data) is written and stored separately from the data it describes. With disk storage, the metadata can be stored in contiguous regions so that the metadata can be read in a small number of I/Os, with a small number of disk seek operations required. SSDs, however, do not exhibit seek time delays, and so that motivation does not apply. In some embodiments, the metadata may be commingled with the data.

Various embodiments may delay the write of a particular data item or metadata item to the non-volatile solid-state storage device for a period of time and buffer writes until $2^k$ sectors of data and metadata have been accumulated. In some cases, this may not be desirable. One example is a storage system which uses flash storage as a cache for disk-backing storage and which needs to keep the cache state intact through unscheduled interruptions such as power failures or system crashes. In this case, changes to the state of the cache as reflected in the data and metadata to be stored on the flash storage must be committed to the flash storage immediately, before acknowledging completion of the storage system read or write operation which initiated the modification of the state of the cache.

Some non-volatile solid-state storage devices contain a power-protected RAM write buffer. This buffer allows the flash device to quickly complete a write request without actually writing data to flash storage. The logic in the non-volatile solid-state storage device that is controlling the power-protected RAM write buffer has a policy controlling when the buffer is written to flash storage (flushed). Typically the buffer is flushed when a write request is received which is not sequentially following the previous writes, or which otherwise does not write to an address near the currently-buffered writes. If the buffer is flushed while containing less than a full erase-block, the performance advantages discussed above may be lost.

In some embodiments, when a partially-filled region of $2^k$ sectors must be committed to flash storage and the flash storage device contains a power-protected RAM write buffer, additional techniques may be used. For example, the entirety of the partially-filled region may be written to the non-volatile solid-state storage device. The write may start at the address which would normally be used for a completely filled region. As the partially-filled region fills, subsequent commits continue to write the entirety of the partially-filled region to the non-volatile solid-state storage device. Each subsequent write may start at the next address which would normally be used for a completely filled region even though the entire region will not be completely filled. This results in overwriting the beginning sectors of the partially-filled region, but non-volatile solid-state storage devices with a compatible power-protected buffer flush policy will not flush their buffer until an entire erase block has been written.

In some embodiments, only the newly-modified sectors of the partially-filled region are written to the non-volatile solid-state storage device. They are written to the same addresses as if the entire region had been written. This results in overwriting at most only the last sector of the last write, but non-volatile solid-state storage devices with a compatible power-protected buffer flush policy will not flush their buffer until an entire erase block has been written.

In other embodiments, a coarse grained technique may be used to provide durability. A well-known sector on the non-volatile solid-state storage device may be chosen to contain a "dirty shutdown" indicator indicating an uncontrolled shutdown of the storage device (e.g., from a loss of power). The dirty shutdown indicator may be as small as a single bit. When the storage device initializes, the dirty shutdown indicator is persistently set to the true state by synchronously writing its containing sector. During an orderly shutdown, I/O to the non-volatile solid-state storage device is quiesced. Once all outstanding I/Os to the non-volatile solid-state storage device have completed, the dirty shutdown indicator is set to false. If an unscheduled interruption shuts down the storage device unexpectedly, the dirty shutdown indicator would be in the true state. To determine if the contents of the non-volatile solid-state storage device can be trusted, the dirty shutdown indicator may be used. A false value would indicate that the contents of the non-volatile solid-state storage device could be trusted. A true value would indicate that the contents of the non-volatile solid-state storage device are potentially inconsistent and therefore should be ignored.

Figure 4:
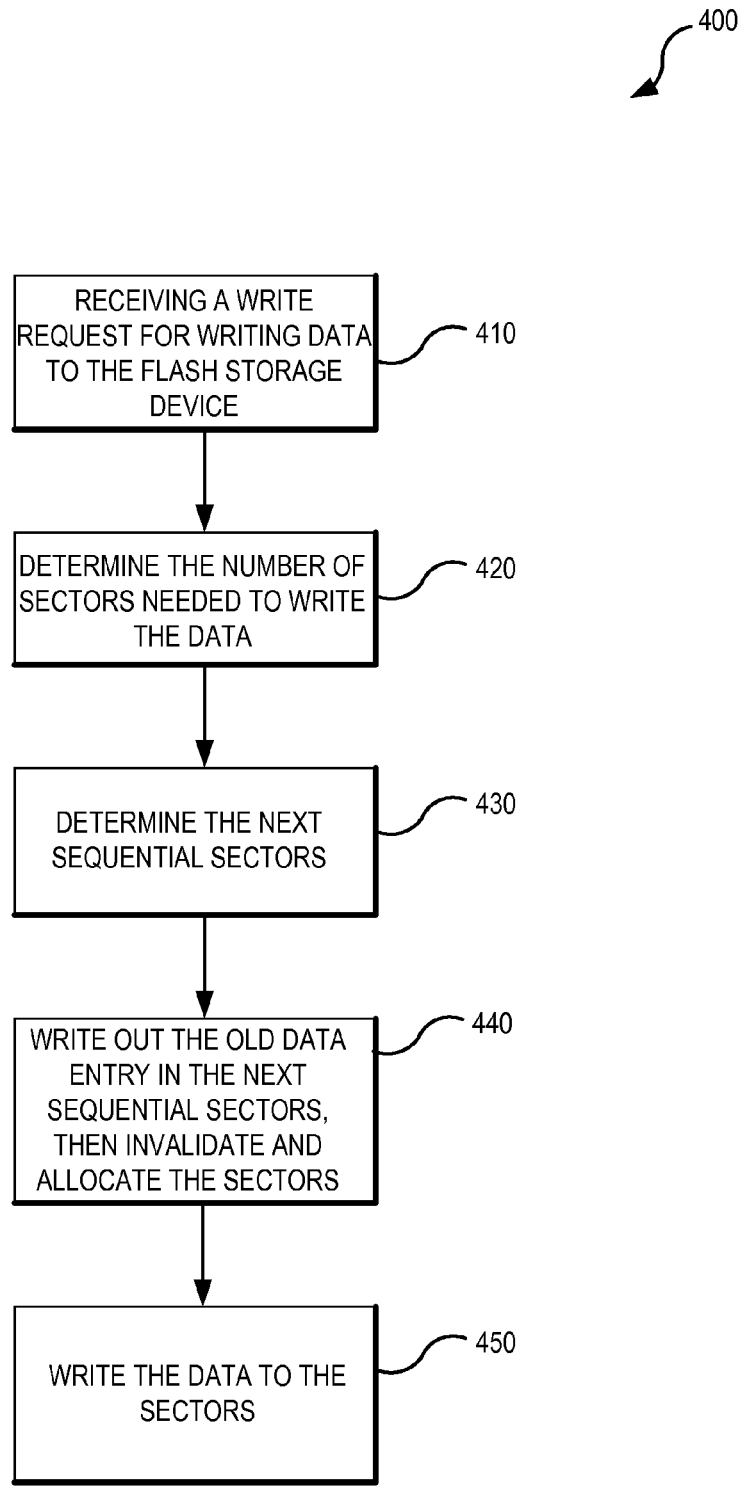
FIG. 4 is a flow chart illustrating a process for processing a write request submitted to a non-volatile solid-state memory device.

The technique of writing only to an integral number of erase blocks can also be advantageous in many other applications. One example is when a non-volatile solid-state storage device is used as a circular log. FIG. 4 is a flow chart illustrating a process 400 for processing a write request submitted to a non-volatile solid-state memory device utilized as a circular log to allow for an efficient, predictable process for utilizing the storage resource. In accordance with various embodiments of the present invention, one or more of the operations in process 400 can be implemented by various system components such as controller 210 in FIG. 2. Receiving operation 410 receives a write request to write data to a non-volatile solid-state storage device (e.g., a flash drive). Determination operation 420 determines the number of sectors needed to write the data to the storage device. For example, the number of sectors can be determined by rounding up to the nearest integer the result from dividing the data size by the size of a sector.

In some embodiments, the sectors of multiple write blocks have been logically divided (e.g., by a sector manager or a controller) into a size corresponding to an integral multiple of a size of an erase block of the non-volatile solid-state storage device. The sectors associated with the circular log can be ordered so that targeting operation 430 targets each successive write operation to the next sequential sector range on the storage device. Once the end of the device is reached, targeting operation 430 can start again at the beginning of the sectors. For example, if w is $2^k$, then sectors 0 . . . (w−1) are written first, followed by sectors w . . . (2w−1), and then by sectors 2w . . . (3w−1) until the logical end of the drive has been reached. At that point, the targeting operation 430 may circle back and target write operations to write blocks 0 . . . (w−1).

Once the sector(s) have been determined, allocation operation 440 writes out the data entry currently stored in the next sequential sector(s), changes the state of the associated cells to invalid, and allocates the cells to allow data to be written. Then, writing operation 450 writes the data from the write request to the sector(s).

Once the non-volatile solid-state storage device is full, the circular log wraps around to the beginning of the logical sectors. At this point, old metadata and data entries in the log must be erased (since a solid-state device does not allow writes to locations that are currently being used without first erasing them) before they are overwritten using allocation operation 440. The term "page replacement policy" is used to refer to a policy or strategy for cleaning these old log entries. Some commonly-known page replacement policies, such as CLOCK, may save a subset of the old metadata and data entries. Other page replacement policies, such as First In First Out (FIFO), will evict all entries a priori. Some embodiments adaptively issue log cleaning operations based on the page replacement policy as described in more detail in FIG. 5.

Figure 5:
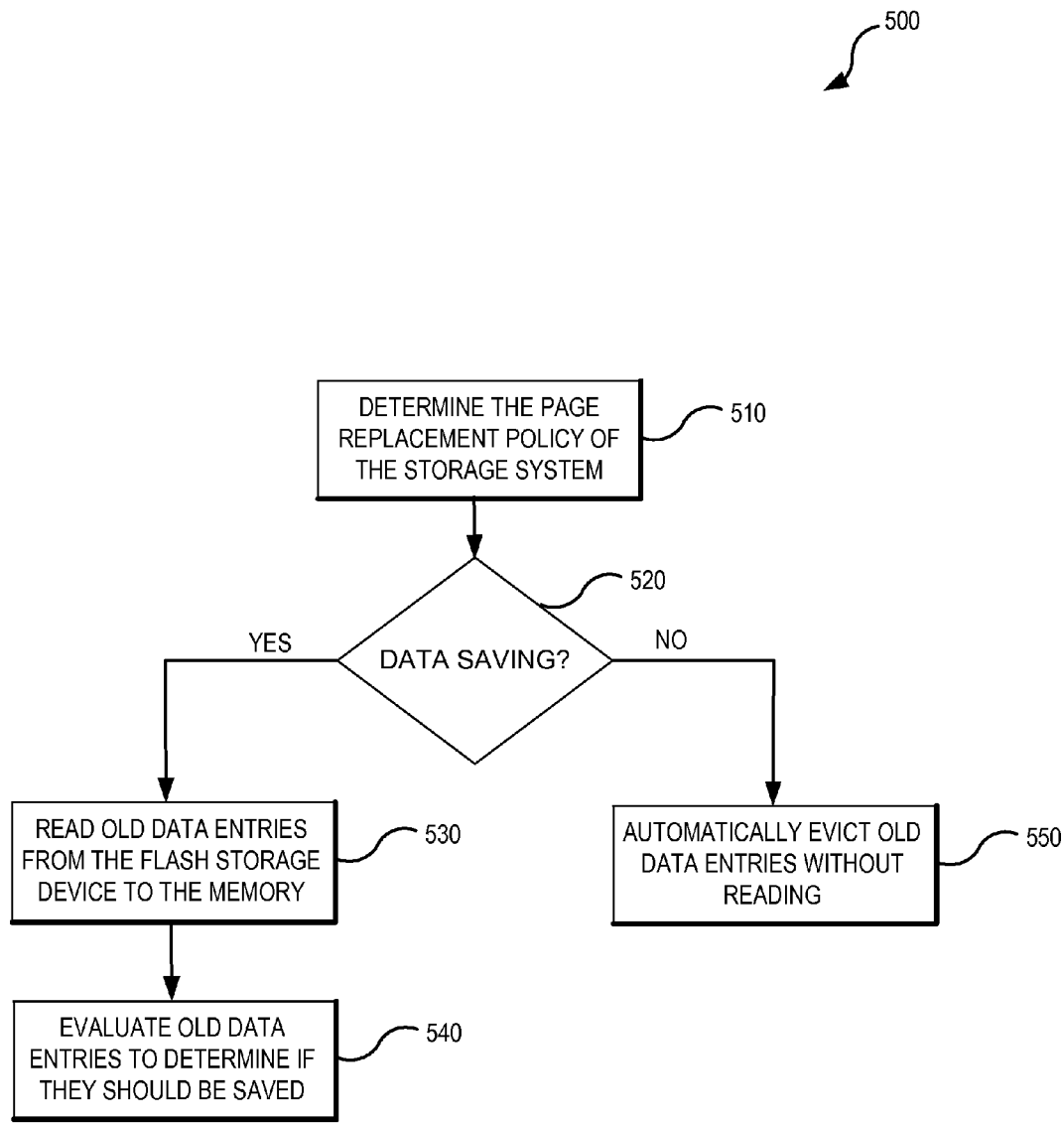
FIG. 5 is a flow chart illustrating a process for operating a non-volatile solid-state memory device based on a page replacement policy.

Some embodiments may issue log cleaning operations based on the page replacement policy as described now with reference to FIG. 5. FIG. 5 is a flow chart illustrating a process 500 for operating a non-volatile solid-state memory device based on the type of page replacement policy. Depending on the type of page replacement policy, the old entries may need to be read before they are evicted. The operations in process 500 may be performed by the controller within the non-volatile solid-state memory device or a processor associated with the memory device or storage system. Page replacement determination operation 510 determines the page replacement policy of the storage system. Then, decision operation 520 determines, based on the type of page replacement policy, whether the page replacement policy saves data (as opposed to evicting all data).

If the page replacement policy is one that may save a subset of the old metadata and data entries, then decision operation 520 branches to reading operation 530. Reading operation 530 reads the old entries into memory (e.g., DRAM 230 in FIG. 2) and evaluates them against the page replacement policy. Evaluation operation 540 determines if the old entries read into memory should be saved. In some embodiments, reading operation 530 can read the old entries from the flash storage device into memory before they are needed for processing. These entries can be read ahead of time in some embodiments where the log is written sequentially, and therefore the log blocks containing these entries will not be written until after the entries have been evaluated against the page replacement policy. The number of read ahead operations that are issued to the flash storage device can by dynamically controlled by a system administrator or intelligent management software.

If the page replacement policy is one that does not save the old metadata and data entries (i.e., evicts all entries), then decision operation 520 branches to eviction operation 550. Eviction operation 550 automatically evicts old data entries without reading the data. As a result, all log cleaning read operations are eliminated since they are unnecessary. Instead of evaluating the old entries, the page replacement policy evicts the old entries from the in-memory data structures. By eliminating these read operations the performance of the flash storage device is improved by avoiding unnecessary operations.

Figure 6:
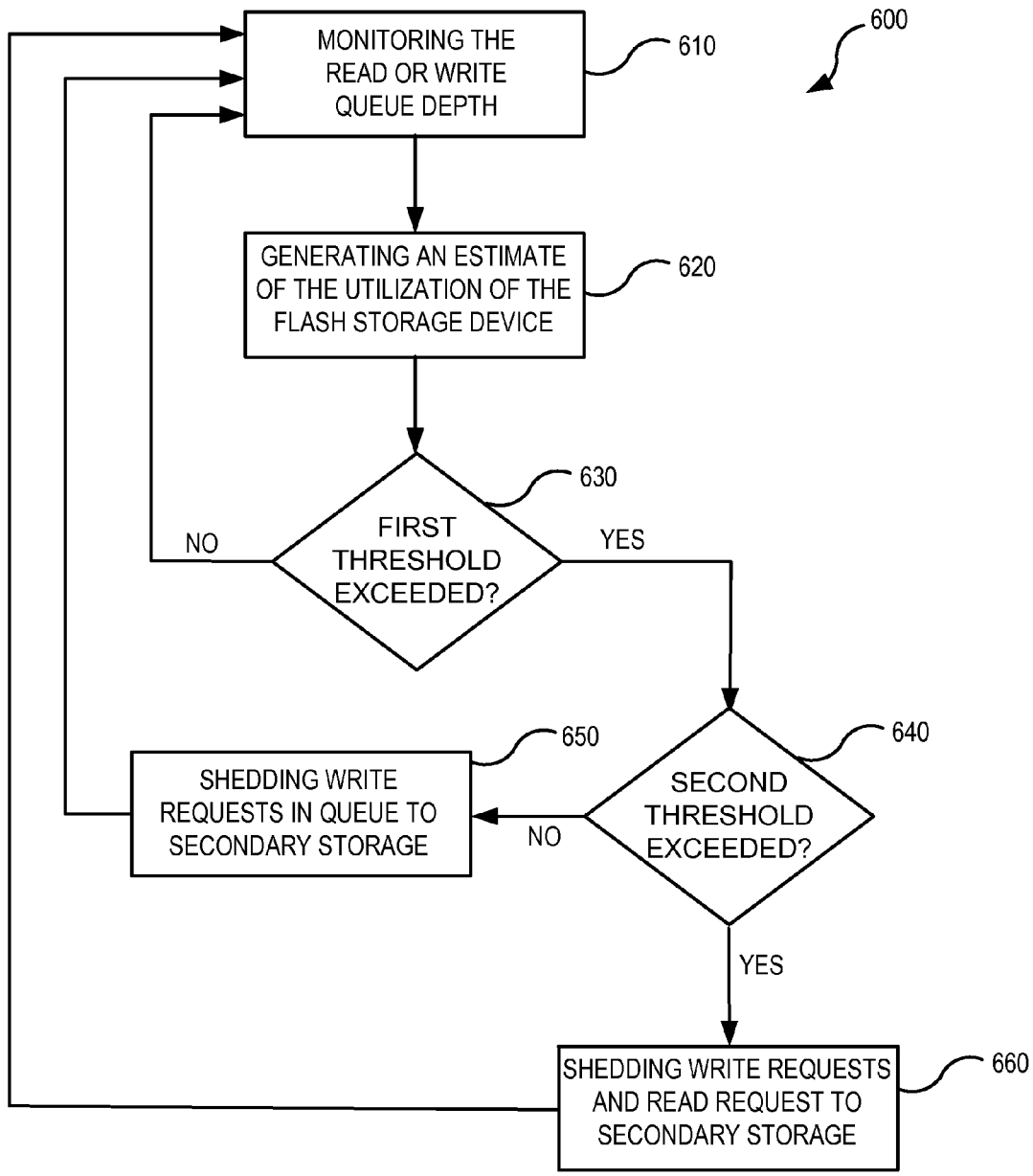
FIG. 6 is a flow chart illustrating a process for shedding write requests and/or read requests from a queue associated with a non-volatile solid-state memory device.

In some embodiments, write and/or read operations to/from non-volatile solid-state memory device are queued. The utilization of the memory device can be estimated as a function of properties of the queue (e.g., depth, rate of change of the queue depth, etc). If, for example, the memory device is being used as a cache and the utilization is too high, it may be advantageous to bypass the cache, a process referred to as "shedding" the read or write operation. FIG. 6 is a flow chart illustrating a process 600 for redirecting (shedding) write requests and/or read requests from a write queue associated with a non-volatile solid-state memory device. One or more of the operations associated with process 600 may be performed by a processor, the storage operating system, the FTL, or other hardware component. When multiple write operations are queued to the non-volatile solid-state storage devices, the utilization of the storage device may be inferred by observing or monitoring the write (or read) queue depth performed by monitoring operation 610.

Estimation operation 620 generates an estimate of the utilization of the non-volatile solid-state memory device. The estimate may be based, at least in part, on the write queue depth determined by monitoring operation 610. For example, if the finite pool of write buffers is nearly empty (i.e., the queue depth is large), the non-volatile solid-state memory device may be inferred to be operating at nearly 100% utilization. If the finite pool of write buffers is nearly full (i.e., the queue depth is small), the non-volatile solid-state memory device may be inferred to be operating at nearly 0% utilization. When operating near 100% utilization, a newly-submitted I/O request will experience a long response time due to the queuing delay incurred by waiting for the completion of I/O's preceding it in the queue.

Once an estimate has been generated, first threshold decision operation 630 determines whether the estimate of the utilization exceeds a first threshold. If not, then decision operation 630 branches back to monitoring operation 610 to continue the monitoring of the write queue depth. If decision operation 630 determines that the first threshold has been exceeded, then operation 630 branches to second threshold decision operation 640 to determine if the estimate of the utilization exceeds a second threshold. If the second threshold is not exceeded, then decision operation 640 branches to write shedding operation 650. Both the first and second thresholds can be adaptively set based on monitored system perform, by a system administrator, by a storage operating system, or other component or subsystem associated with a storage system.

Write shedding operation 650 redirects (sheds) write requests (e.g., non-essential writes such as those resulting from a read-miss) within the write queue to a secondary storage device. For example, for a storage system using flash storage devices as a cache for some backing store, or some other organization where data is available both in some other backing store and in the flash storage, the total I/O capacity (throughput) of the backing store may exceed that of the flash storage devices. The backing store at least provides some I/O capacity in addition to that of the flash storage devices. If the I/O demand exceeds the I/O capacity of the flash devices (that is, the I/O demand would exceed 100% utilization of the flash storage devices), the storage system can improve the overall performance of the system by shedding load from the flash storage devices, and where necessary, satisfying the I/O requests using the backing storage.

Specifically, in the context of cache storage system using non-volatile solid-state devices (e.g., flash), the system may choose to shed load by discarding non-essential writes to the cache storage device when the size of the write queue to the storage device exceeds some threshold. An example of a non-essential write is a write entering new data in the cache storage device as a result of either a read-miss in the cache or a write to the cache. In the case of a write to some location already entered in the cache, while the data may not be written to the cache storage device, metadata invalidating the old cache entry must still be written to the flash storage device. However, this metadata is much smaller than the data and so the net result is still a reduction in the I/O load on the flash storage device. Write requests that are not entered in the cache must be handled by writing the data directly to the backing storage. Read-misses that are not entered in the cache may simply be discarded.

If second threshold decision operation 640 determines the size of the write queue to the flash storage device exceeds a second larger threshold, the system may choose to shed additional load by discarding non-essential reads (in addition to non-essential writes) from the cache storage device using shedding operation 660. An example of a non-essential read is a flash read to satisfy a cache read-hit. The read request may instead be handled by reading from the backing store rather than the flash storage device, provided that the data requested does not uniquely reside in the cache (e.g., the cache uses a write-though or write-around policy, or the cache uses a write-back policy but the data requested is not marked as only available in the cache). Shedding operation 660 then branches to monitoring operation 610 where the write queue depth is monitored.

In addition to shedding (or redirecting) write requests, some embodiments of the present invention can bypass the cache storage for non-essential operations. In a computer storage system, a storage cache frequently has a shorter service time than the backing store but a lower total I/O capacity (maximum throughput). In such systems, at some high level of I/O demand, the response time for accessing the cache will exceed the response time for directly accessing the backing store due to the large queuing delay in accessing the underlying storage for the cache. At this level of I/O demand, the system can provide better performance by bypassing the cache storage for non-essential operations. For example, rather than serving a read I/O request from the cache, the system may offer better performance by serving the read I/O request directly from the backing store.

Prior cache bypass mechanisms focus on CPU caches where there is no asymmetry between the service time and maximum throughput of the cache storage and the backing storage. In such caches, the intent of cache bypass mechanisms is to identify the addresses of data which will not be referenced again and to avoid caching such data, since caching it would pollute the cache with useless data and thereby reduce the cache hit ratio. In contrast, various embodiments discussed herein apply when there is an asymmetry between the service time and maximum throughput of the cache storage and the backing storage. It does not attempt to identify data which should not be cached by its address but instead makes opportunistic decisions based on the current ratio of the total I/O demand on the cache versus the available I/O capacity of the cache storage device.

Figure 7:
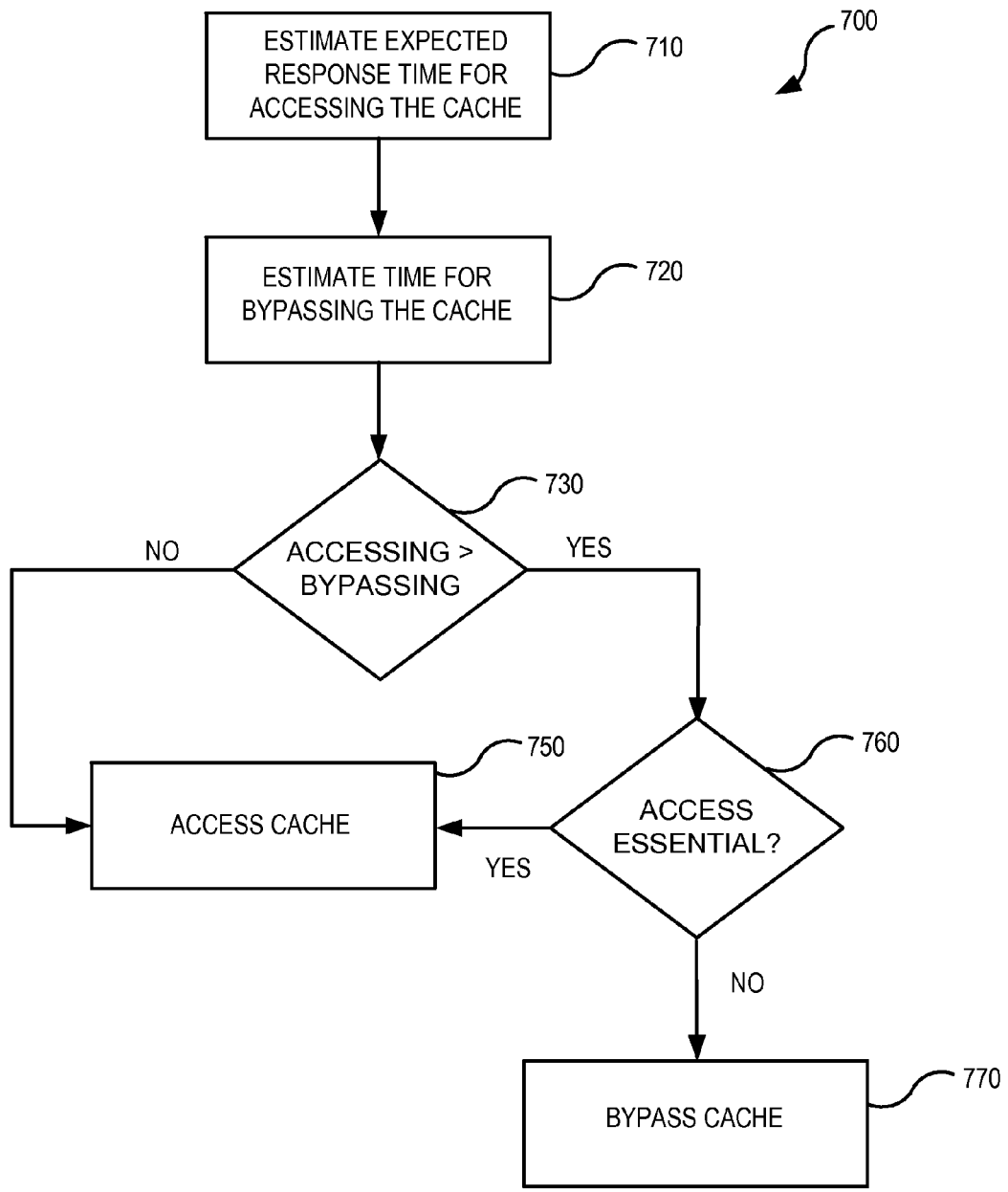
FIG. 7 is a flow chart illustrating a process for improving the performance of host-side non-volatile solid-state device caches by bypassing the non-volatile solid-state storage devices.

FIG. 7 is a flow chart illustrating a process 700 for improving the performance of host-side non-volatile solid-state device (e.g., flash) caches by bypassing the non-volatile solid-state storage devices when the load on the devices is so high that it is faster to obtain the data from the backing store. One or more of the operations associated with process 700 may be performed by a processor, the storage operating system, or bypass logic. In some embodiments, the bypass logic does not require coupling the cache logic to direct measurements of the I/O response time of the storage devices; it is self-contained within the cache algorithms.

As illustrated in FIG. 7, access estimation operation 710 estimates the expected response time for accessing the cache given the current level of I/O demand. Access estimation operation can be performed continuously, periodically, on a pre-determined schedule, and/or upon the detection of one or more events. Bypass estimation operation 720 estimates the expected response time for bypassing the cache and directly accessing the backing store. Techniques for estimating these values are described below. If comparison operation 730 determines that the expected response time for accessing the cache is less than or equal to the expected response time for directly accessing the backing store, then comparison operation 730 branches to cache access operation 750 where the cache is accessed. If comparison operation 730 determines that the expected response time for accessing the cache is greater than the expected response time for directly accessing the backing store, then, comparison operation 730 branches to determination operation 760 to determine if the cache access is essential.

The cache access may be essential to the correct operation of the cache, in which case it does not bypass the cache. One example of an essential operation is the invalidation of existing data in the cache when that data is overwritten. Another example of an essential operation is the reading of data from a write-back cache when the cache contains the only current copy of the data. One example of a non-essential operation is the insertion of data in the cache when the data is written. Another example of a non-essential operation is the reading of data from either a write-back or a write-through cache when a current copy of the data exists in the backing storage. If the cache access is not essential, then determination operation 760 branches to bypass operation 770 where the system bypasses the cache and directly accesses the backing store. For both read and write operations, if the cache access is essential the determination operation 760 branches to cache access operation 750 where the cache is accessed.

In various embodiments, the expected response times for the cache storage and the backing storage may be estimated using models based on queuing theory with measurements made by the cache logic as input to the models. For example, the cache logic may maintain measurements of the mean response times and the current and mean queue depths for the cache and backing stores. Given a measured mean response time of $t_r$ and a measured mean queue depth of N, we may use Little's Law to express the mean service time $t_s$ as:

$$t_s = t_r/N$$

The expected instantaneous response time $t_{ri}$ can then simplify the current instantaneous queue depth $N_i$ times the mean service time $t_s$:

$$t_{ri} = N_i t_s$$

The cache logic may compute these expected response times and direct the I/O to bypass the cache if the operation is non-essential to the cache and the expected response time for the backing store is less than that of the cache storage.

In some embodiments, the expected response time may be estimated using a model along with measurements of a sampling of the response times for the cache storage and/or backing storage rather than complete statistics. For example, rather than instrumenting all operations on the cache store, the cache logic may instrument only the write operations. This reduces the CPU overhead cost of the bypass algorithm since only a fraction of the operations incur the overhead cost of the performance measurement code.

In other embodiments, the expected response time may be qualitatively estimated using a model and measurements of a sampling of the response times for the cache storage and/or backing storage, rather than quantitatively estimated. The expected response time is large when the current instantaneous queue depth of the sampled subset of the operations is large (i.e., when there are a large number of outstanding sampled operations). When the expected response time of the cache storage is large and the expected response time of the backing store is small, the cache logic may direct the I/O to bypass the cache if the operation is non-essential to the cache.

The expected response time for the cache storage may be estimated using one of the methods described above, but the expected response time for the backing storage maybe estimated as constant that is based on performance measurements made in a laboratory using a representative I/O workload.

The effect of the cache bypass on the cache hit ratio may be moderated by preferentially choosing which types of non-essential operations to bypass. As the expected response time of the cache storage approaches that of the backing store, the bypass logic first chooses to bypass less preferred operations such as insertion of newly-written data into the cache, but does not bypass more-preferred operations such as servicing read hits from the cache. When the expected response time of the cache storage exceeds that of the backing store, the bypass logic bypasses all non-essential operations, leaving only the operations that are essential to the correct operation of the cache.

In various embodiments, the cache manages all writes to the cache storage device as appending to a circular log. It maintains a fixed-size pool of free buffers to be filled and then asynchronously written to the log on the cache storage device. The number of write operations in progress at the cache storage device can be inferred by subtracting the current number of free buffers in the pool from the size of the pool, and as described above can be used to qualitatively estimate the response time for the cache storage. When the number of free buffers becomes less than a certain threshold (determined heuristically, via modeling, or through experimental measurements), the cache logic begins bypassing the insertion of newly-written data in the cache, and the insertion of data from cache read-misses. It must still enter invalidations if the newly-written data overwrites data already in the cache. When the number of free buffers becomes less than a second, lower threshold, the cache logic begins bypassing read operations which hit in the cache, as long as the cache does not contain the only up-to-date copy of the data, in addition to continuing to bypass the insertion of newly-written data in the cache and the insertion of data from cache read-misses. One advantage of these embodiments is that they do not require the overhead of collecting response time statistics on each I/O, and the software structural advantage of accessing only data-structures local to the cache write logging code, thus avoiding coupling between the cache software module and other external modules such as the device drivers for the cache storage and backing storage.

The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

In this description, the phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily all refer to the same embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
maintaining a circular log on a non-volatile solid-state storage device as a cache for data from a secondary storage device;
monitoring a depth of a write queue in a memory to estimate a utilization of the non-volatile solid-state storage device having sectors with a size corresponding to an integral multiple of a size of an erase block of the non-volatile solid-state storage device, wherein the non-volatile solid-state storage device erases data in units of the erase block;
determining if the estimate of utilization exceeds a first utilization threshold;
in response to determining that the estimate of utilization exceeds the first utilization threshold, shedding a write request within the write queue to the secondary storage device;
determining if the estimate of utilization exceeds a second utilization threshold; and
in response to determining that the estimate of utilization exceeds the second utilization threshold, shedding a non-essential read from the non-volatile solid-state storage device to the secondary storage device.

2. The method of claim 1, wherein the shed write request to the secondary storage device includes a non-essential write resulting from one of a read-miss in the cache and a write to the cache when a current copy of the data exists in the secondary storage device.

3. The method of claim 1, wherein the first utilization threshold and the second utilization threshold are adaptively set.

4. The method of claim 1, where the non-essential read includes a flash read to satisfy a cache read-hit.

5. A method comprising:
maintaining a circular log on a non-volatile solid-state storage device as a cache for data from a secondary storage device;
monitoring a depth of a write queue in a memory to estimate a utilization of the non-volatile solid-state storage device with sectors having a size corresponding to an integral multiple of a size of an erase block of the non-volatile solid-state storage device, wherein the non-volatile solid-state storage device erases data in units of the erase block;
determining if the estimate of utilization exceeds a utilization threshold; and
in response to determining that the estimate of utilization exceeds the utilization threshold, shedding a write request having the data within the write queue to the secondary storage device, wherein the shed write request includes a non-essential write resulting from one of a read-miss in the cache and a write to the cache when a current copy of the data exists in the secondary storage device.

6. The method of claim 5, further comprising:
estimating a first expected response time for accessing the non-volatile solid-state storage device;
estimating a second expected response time for accessing the secondary storage device; and
accessing the secondary storage device to satisfy a read request, when the second expected response time is less than the first expected response time.

7. The method of claim 6 wherein estimating the first expected response time further comprises:
computing a mean service time from a measured mean of the depth of the write queue and a measured mean response time of the write queue.

8. The method of claim 6 wherein estimating the first expected response time further comprises:
computing an expected instantaneous response time from a mean service time and an instantaneous depth of the write queue.

9. The method of claim 5, further comprising:
storing the data in the write queue until the write queue contains a write unit worth of data; and
writing, from the write queue to the non-volatile solid-state storage device, the write unit worth of data.

10. The method of claim 9, wherein shedding the write request having the data further comprises interspersing metadata regarding the data within the data written to the write unit.

11. The method of claim 9, further comprising:
estimating the size of the erase block of the non-volatile solid-state storage device; and
setting a size of the write unit to be an integral multiple of the estimate of the erase block size.

12. A processing system comprising:
a processor;
a memory coupled to the processor;
a secondary storage device coupled to the processor;
a non-volatile solid-state storage device coupled to the processor, the non-volatile solid-state storage device including sectors having a size corresponding to an integral multiple of a size of an erase block of the non-volatile solid-state storage device, wherein the non-volatile solid-state storage device erases data in units of the erase block; and
a process executing on the processor operable to:
maintain a circular log on the non-volatile solid state storage device as a cache for data from the secondary storage device;
monitor a depth of a write queue in the memory to estimate a utilization of the non-volatile solid-state storage device;
determine if the estimate of utilization exceeds a utilization threshold; and
in response to determining that the estimate of utilization exceeds the utilization threshold, shed a write request associated with the data within the write queue to the secondary storage device, wherein the shed write request includes a non-essential write resulting from one of a read-miss in the cache and a write to the cache when a current copy of the data exists in the secondary storage device.

13. The processing system of claim 12, wherein in an event that a write operation reaches an end of a sector range of the circular log of the non-volatile solid-state storage device, continuing the write operation at a beginning of the sector range of the circular log.

14. The processing system of claim 12, further comprising:
a log cleaning process executing on the processor operable to employ a page replacement policy to evict an old data entry of the cache to make space for the data associated with the shed write request.

15. The processing system of claim 14, wherein the process is further operable to:
automatically read the old data entry from the cache to the memory before the old data entry is needed for processing when the page replacement policy saves a subset of the old data entry.

16. The processing system of claim 15, wherein the read of the old data entry from the cache is avoided when the page replacement policy does not save the old data entry.

17. The processing system of claim 12, wherein the non-volatile solid-state storage device includes flash transition layer to map client page addresses to internal page addresses.

18. The processing system of claim 12, wherein the non-volatile solid-state storage device is a NAND flash storage device.

19. A system comprising:

a processor;

a memory coupled to the processor;

a secondary storage device coupled to the processor;

a non-volatile solid-state storage device coupled to the processor, the non-volatile solid-state storage device including sectors having a size corresponding to an integral multiple of a size of an erase block of the non-volatile solid-state storage device, wherein the non-volatile solid-state storage device erases data in units of the erase block; and a process executing on the processor operable to:
    maintain a circular log on the non-volatile solid state storage device as a cache having data entries for storing data from the secondary storage device;
    monitor a depth of a write queue in the memory to estimate a utilization of the non-volatile solid-state storage device;
    determine if the estimate of utilization exceeds a utilization threshold; and
    in response to determining that the estimate of utilization exceeds the utilization threshold, shed a write request associated with the data within the write queue to the secondary storage device, wherein the shed write request includes a non-essential write resulting from one of a read-miss in the cache and a write to the cache, and wherein metadata is dispersed within the data entries.

20. The system of claim 19, wherein the metadata is stored at a beginning of the data entries.

21. The system of claim 19, wherein successive write operations target sequential sectors of the non-volatile solid-state storage device.

22. The system of claim 21 wherein the sequential sectors are physically adjacent sectors.

* * * * *